(12) United States Patent
Rozenberg (10) Patent No.: US 9,641,588 B2
(45) Date of Patent: May 2, 2017

(54) PACKETS RECOVERY SYSTEM AND METHOD

(71) Applicant: Adi Rozenberg, Shoham (IL)

(72) Inventor: Adi Rozenberg, Shoham (IL)

( * ) Notice: Subject to any disclaimer, the term of this patent is extended or adjusted under 35 U.S.C. 154(b) by 44 days.

(21) Appl. No.: 14/370,025

(22) PCT Filed: Dec. 31, 2012

(86) PCT No.: PCT/IL2012/000403
§ 371 (c)(1),
(2) Date: Jun. 30, 2014

(87) PCT Pub. No.: WO2013/098811
PCT Pub. Date: Jul. 4, 2013

(65) Prior Publication Data
US 2015/0029856 A1    Jan. 29, 2015

(30) Foreign Application Priority Data

Jan. 1, 2012    (IL) .......................................... 217306

(51) Int. Cl.
| | |
|---|---|
| *H04L 29/06* | (2006.01) |
| *H04L 12/26* | (2006.01) |
| *H04L 1/18* | (2006.01) |
| *H04L 1/00* | (2006.01) |
| *H04L 29/14* | (2006.01) |
| *H04N 21/6437* | (2011.01) |
| *H04N 21/647* | (2011.01) |

(52) U.S. Cl.
CPC ............ *H04L 65/80* (2013.01); *H04L 1/0014* (2013.01); *H04L 1/1841* (2013.01); *H04L 1/1867* (2013.01); *H04L 43/0829* (2013.01); *H04L 65/608* (2013.01); *H04L 69/40* (2013.01); *H04N 21/6437* (2013.01); *H04N 21/64776* (2013.01); *H04N 21/64784* (2013.01)

(58) Field of Classification Search
CPC ... H04L 63/0272; H04L 63/20; H04L 65/608; H04L 43/0829; H04L 43/087; H04L 43/10; H04M 2207/006; H04M 2207/35
See application file for complete search history.

(56) References Cited

U.S. PATENT DOCUMENTS

| | | | | |
|---|---|---|---|---|
| 7,590,889 | B1 * | 9/2009 | Maxemchuk | H04L 12/1868 714/18 |
| 8,037,392 | B1 * | 10/2011 | Sahar | H03M 13/2915 375/240.27 |
| 2002/0141390 | A1 * | 10/2002 | Fangman | H04L 29/06027 370/352 |
| 2006/0224745 | A1 * | 10/2006 | Sharpe | H04L 1/1877 709/227 |

(Continued)

*Primary Examiner* — David Oveissi
(74) *Attorney, Agent, or Firm* — Haim M. Factor; 1st-Tech-Ideas (57) ABSTRACT

In a network for reliable transfer of packets from a transmitter to a receiver using a Real-time Transport Protocol (RTP), a system for packet recovery, the system comprising a detection block (detector) for packet loss detection and a probe device (probe) for lost packet retransmission, wherein the detector is configured to send a packet retransmit request to the probe upon detecting a packet loss (a lost packet), and wherein the probe is configured to store received packets and retransmit the lost packet responsive to the retransmit request.

11 Claims, 9 Drawing Sheets

(56) References Cited

U.S. PATENT DOCUMENTS

2007/0230361 A1\* 10/2007 Choudhury ......... H04L 12/2602
370/250
2008/0291842 A1\* 11/2008 Isambart .............. H04N 17/004
370/252

\* cited by examiner

PACKETS RECOVERY SYSTEM AND METHOD

This US National Stage application claims priority from claims priority from Israel patent application no. 217306, filed 1 Jan. 2012 and from PCT application no. PCT/IL2012/000403, filed 31 Dec. 2012, whose disclosures are incorporated herein by reference.

Embodiments of the present invention relate to systems for reliable transfer of packet over a network and more specifically to systems for packets recovery in a media stream.

BACKGROUND

During packet transmission over a network, packets may be occasionally lost. Accordingly, forward error coding (FEC) means are used as known in the art to generate and transmit additional packets, which can be used in a receiver to recover such lost packets.

Figure 1:
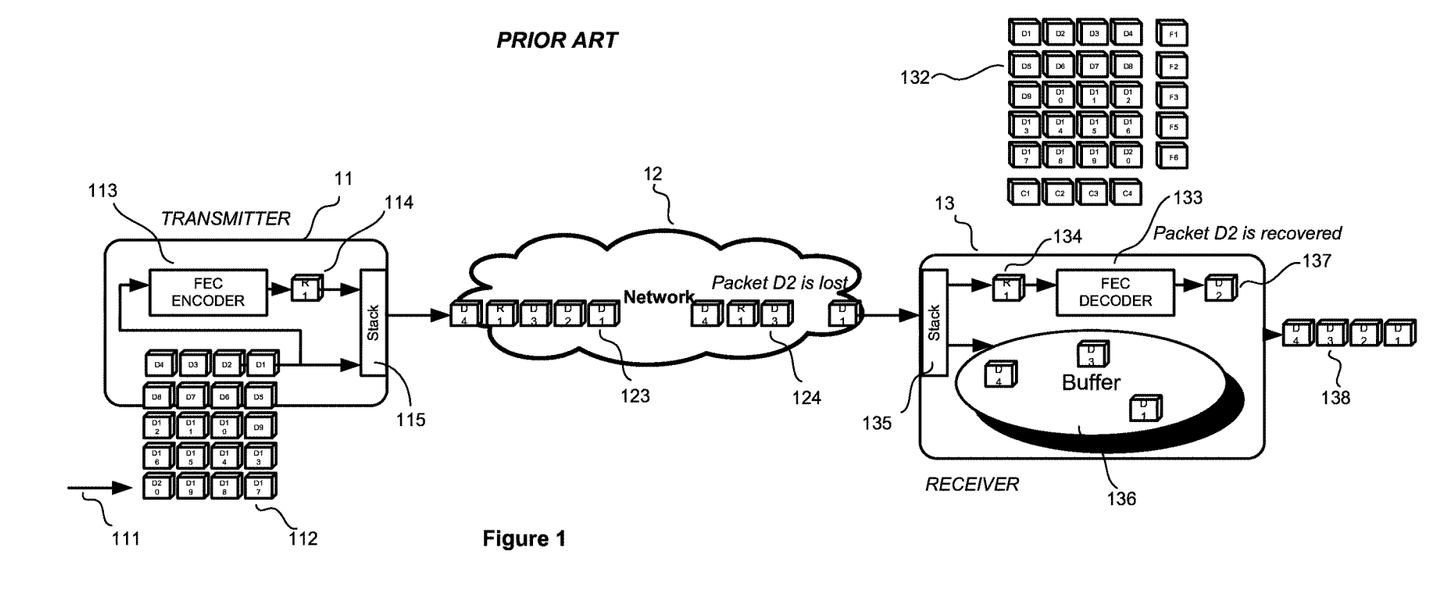
FIG. 1 illustrates a Prior Art system for transmitting media packets with ProMpeg/SMPTE2022 FEC packets.

FIG. 1 illustrates a Prior Art system for transmitting media packets having ProMpeg/SMPTE2022 FEC packets. A transmitter 11 sends serially transmitted packets 123, including data (D1, D2, D3 . . . ) and FEC (R1 . . . ) packets, over a network 12 to a receiver 13.

Data in 111 stream is formed into data to be transmitted 112, in matrix form. A FEC encoder 113 processes the data to generate, for example, a FEC packet R1 114. The data and FEC packets are transmitted through a stack 115. After being transferred through the network 2, serially received packets 124 arrive at receiver 13, with an exemplary lost data packet (D2). In receiver 13, the packets are received in a stack 135, and from there are transferred to a data buffer 136. A received FEC packet R1 134 is transferred to a FEC decoder 133, wherein a recovered D2 packet 137 is generated. The data out, received packets 138 include the lost packet D2, along with the rest of the packets.

A standard media delivery system comprises transmitter 11 and receiver 13 devices; and the media stream is transmitted using a Real Time Protocol (RTP) from the transmitter to the receiver. The referenced prior art system does not include built-in support for packet retransmission, as is performed with Data delivery protocols such as TCP.

Embodiments of the present invention provide an infrastructure and system to add retransmission capability to media delivery systems using an RTP Protocol, as described hereinbelow.

SUMMARY OF THE INVENTION

According to one aspect of the present invention, a novel system does not depend on FEC to recover lost packets and the system does not send FEC blocks with the data rather the system automatically detects lost packets and reports to the transmitter; and the lost packets are then re-sent. According to another aspect of the present invention, a novel system includes two blocks, a probe device and a detection block.

The probe device listens to video over IP streams in the network. The stream is then stored in a cyclic buffer. The packets stored in the cyclic buffer may be called from time to time to compensate for lost packets in other sections of the network. The detection block accepts the transport stream packets and inspects it for any lost packets. Upon detection of a lost/missing packet, the detection block signals the probing block about the missing packet, using an RTCP message. The probe device then uses the RTCP message to extract the missing packet from its cyclic buffer and to send it back to the original stream.

The recovered packet is treated by any RTP receiver as a re-ordered packet and it is placed in its correct location in the original stream.

The present patent application is the second of four applications presently filed by the present applicant and inventor. Embodiments of the inventions disclosed in these applications can be used together in various combinations:
1. Adaptive FEC System and Method
2. Packets Recovery System and Method
3. Transport over UDP System and Method
4. Media Stream Rate Reconstruction System and Method Further purposes and benefits of the current invention will become apparent upon reading the present disclosure and the related drawings.

DETAILED DESCRIPTION OF THE INVENTION

Glossary of Terms

Throughout the present disclosure, the following terms may be used:

Moving Picture Experts Group (MPEG) is a working group of experts that was formed by ISO and IEC to set standards for audio and video compression and transmission.

MPEG transport stream (TS) is a standard format for transmission and storage of audio, video, and Program and System Information Protocol (PSIP) data, and is used in broadcast systems such as DVB and ATSC. Transport Stream is specified in MPEG-2 Part 1, Systems (formally known as ISO/IEC standard 13818-1 or ITU-T Rec. H.222.0).

TS Packet is the basic unit of data in a transport stream. It consists of a sync byte, whose value is 0×47, followed by three one-bit flags and a 13-bit Packet Identifier (PID). This is followed by a 4-bit continuity counter. Additional optional transport fields, as signaled in the optional adaptation field, may follow. The rest of the packet consists of payload. Packets are 188 bytes in length.

Program Identifier (PID) Each table or elementary stream in a transport stream is identified by a 13-bit packet ID (PID). A demultiplexer extracts elementary streams from the transport stream in part by looking for packets identified by the same PID.

Program Clock Reference (PCR) is transmitted in the adaptation field of an MPEG-2 transport stream packet. The value of the PCR, when properly used, is employed to generate a system timing clock in the decoder. The PCR is used by the decoder to present synchronized content, such as audio tracks matching the associated video, at least once each 100 ms.

Real-time Transport Protocol (RTP) defines a standardized packet format for delivering audio and video over IP networks. RTP is used extensively in communication and entertainment systems that involve streaming media, such as telephony, video teleconference applications, television services and web-based push-to-talk features. RTP is used in conjunction with the RTP Control Protocol (RTCP). While RTP carries the media streams (e.g., audio and video), RTCP is used to monitor transmission statistics and quality of service (QoS) and aids synchronization of multiple streams. RTP is originated and received on even port numbers and the associated RTCP communication uses the next higher odd port number. RTP was developed by the Audio-Video Transport Working Group of the Internet Engineering Task Force (IETF) and first published in 1996 as RFC 1889, superseded by RFC 3550 in 2003.

User Datagram Protocol (UDP) is one of the core members of the Internet Protocol Suite, the set of network protocols used for the Internet. With UDP, computer applications can send messages, in this case referred to as datagrams, to other hosts on an Internet Protocol (IP) network without requiring prior communications to set up special transmission channels or data paths. UDP uses a simple transmission model without implicit handshaking dialogues for providing reliability, ordering, or data integrity. Thus, UDP provides an unreliable service and datagrams may arrive out of order, appear duplicated, or go missing without notice. UDP assumes that error checking and correction is either not necessary or performed in the application, avoiding the overhead of such processing at the network interface level.

Set-Top Box (STB) is an information appliance device that generally contains an interface to a network and connects to a television set and an external source of signal, turning the signal into content which is then displayed on the television screen or other display device. In IP networks, the set-top box is a small computer providing two-way communications on an IP network and decoding the video streaming media. IP set-top boxes have a built in home network interface which can be Ethernet or one of the existing wire home networking technologies.

Forward Error Correction (FEC)—Technique to recover packet information partial or full, based on calculation made on the information. Such techniques maybe by means of XOR between packets or any other mathematical computation.

Pro-MPEG—the Professional-MPEG Forum—is an association of broadcasters, program makers, equipment manufacturers, and component suppliers with interests in realizing the interoperability of professional television equipment, according to the implementation requirements of broadcasters and other end-users.

SMPTE 2022—The Pro-MPEG Forum began initial work on a FEC scheme for video transport. That work, added to by the Video Services Forum, was introduced to SMPTE. This proposed standard is known as SMPTE 2022, and it describes both a FEC scheme and a way to transport constant bit rate video over IP networks.

Embodiments of the current invention are now described by way of example and with reference to the accompanying drawings.

Figure 2:
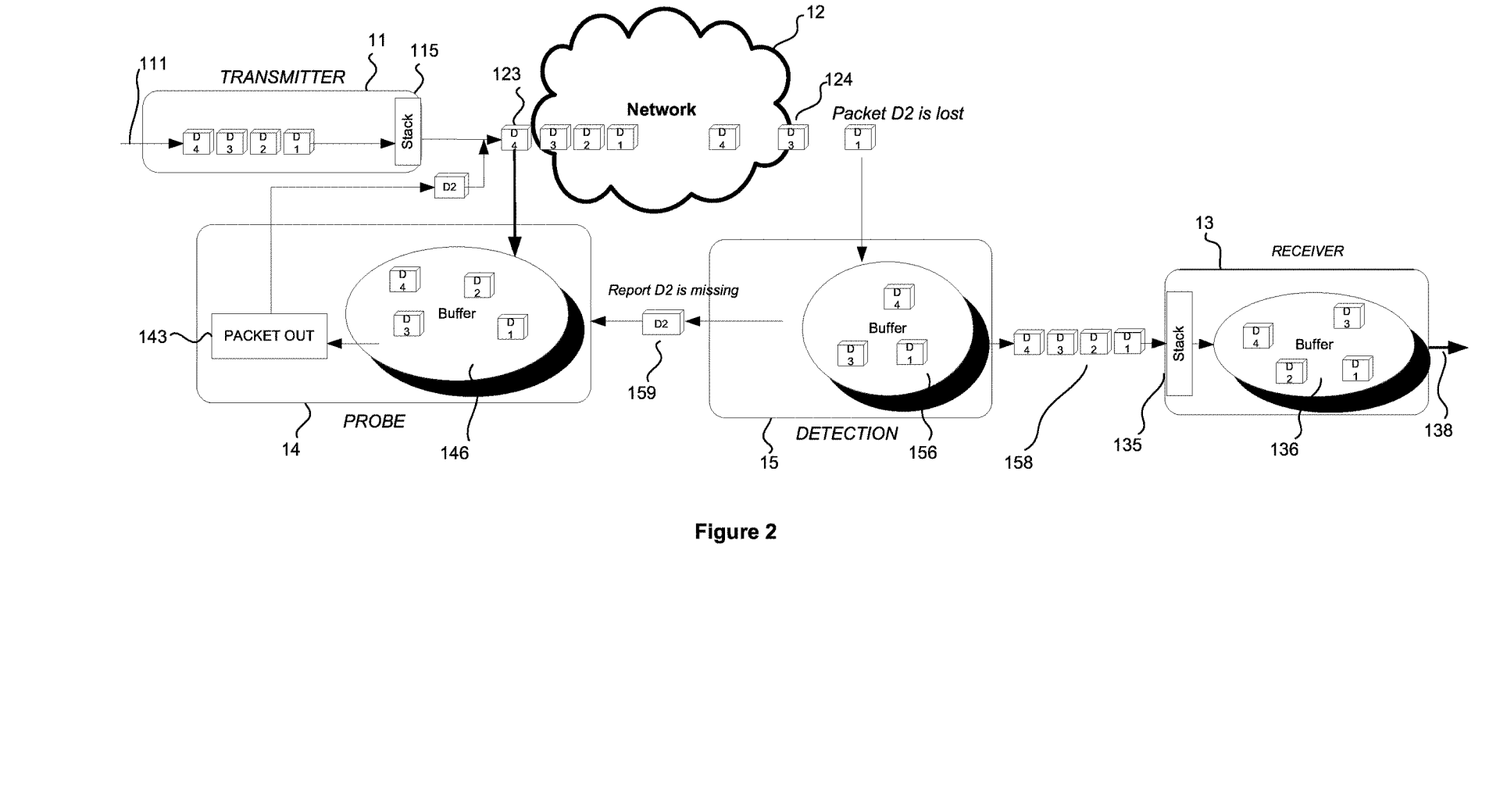
FIG. 2 illustrates a system for protecting media streaming in an intrusive implementation.

FIG. 2 illustrates a system for protecting media streaming in an intrusive implementation, wherein the detection device 15 is responsible for handling the packet recovery process. The system further includes a probe device 14.

A transmitter 11 sends serially transmitted packets 123, including data (D1, D2, D3 . . . ) packets, over a network 12 and detection means 15, to a receiver 13. Data in 111 stream to the transmitter 11 is then sent out through stack 115.

After be transferred through network 12, serially received packets 124 arrive at detection means 15, with an exemplary lost data packet (D2).

The Probe device 14 comprises an IP interface, a Memory buffer 146, a Transport processing block, an RTCP and a processor. Any packet received by the IP interface is forwarded to the memory buffer in a sequential order. Detection device 15 follows the same probing as the probe device. Detection device 15 probes the incoming stream for missing packets and reports the information through a RTCP (Real Time Control Protocol—the control extension of the RTP protocol) message 159.

A special RTCP message 159 is sent with a list of one or many lost packets. Probe device 14 uses the RTCP message list to read out requested packet 143 back to the original media stream.

The RTP sequence number is used to generate a list to verify the order of the packets. Whenever disorder is detected, the processor can change the position of the internal packet back to its original state. Whenever packet information is unaccounted for, the detection device can issue a request for a packet loss intervention to occur.

Any reconstructed packet is returned back to the buffered stream. The system may be deployed in an intrusive mode (ref FIG. 2), where the detection device buffers the stream in buffer 156 and handles reinsertion of the retransmitted packets into the stream.

The system includes a transmitter 11, a network 12, and a receiver 13. Receiver 13 includes a stack 135 and a data buffer 136, with a data out, received packets 138.

The RTCP messaging solution applied by an embodiment of the current invention allows the detection device to send one or more packet loss event messages to the probe device to serve as an alert of lost packet detection. The system may use a multi-layered solution to send one or more requests of missing events to provide a higher protection assurance (in case the probe does not receive the original request or the recovery packet did not reach the detection device). Reception of more than one request for the same loss event may result in one or more protective packets to be sent by the probe device. The receiving device ignores duplicate packets and treats the event as packet duplication.

Figure 3:
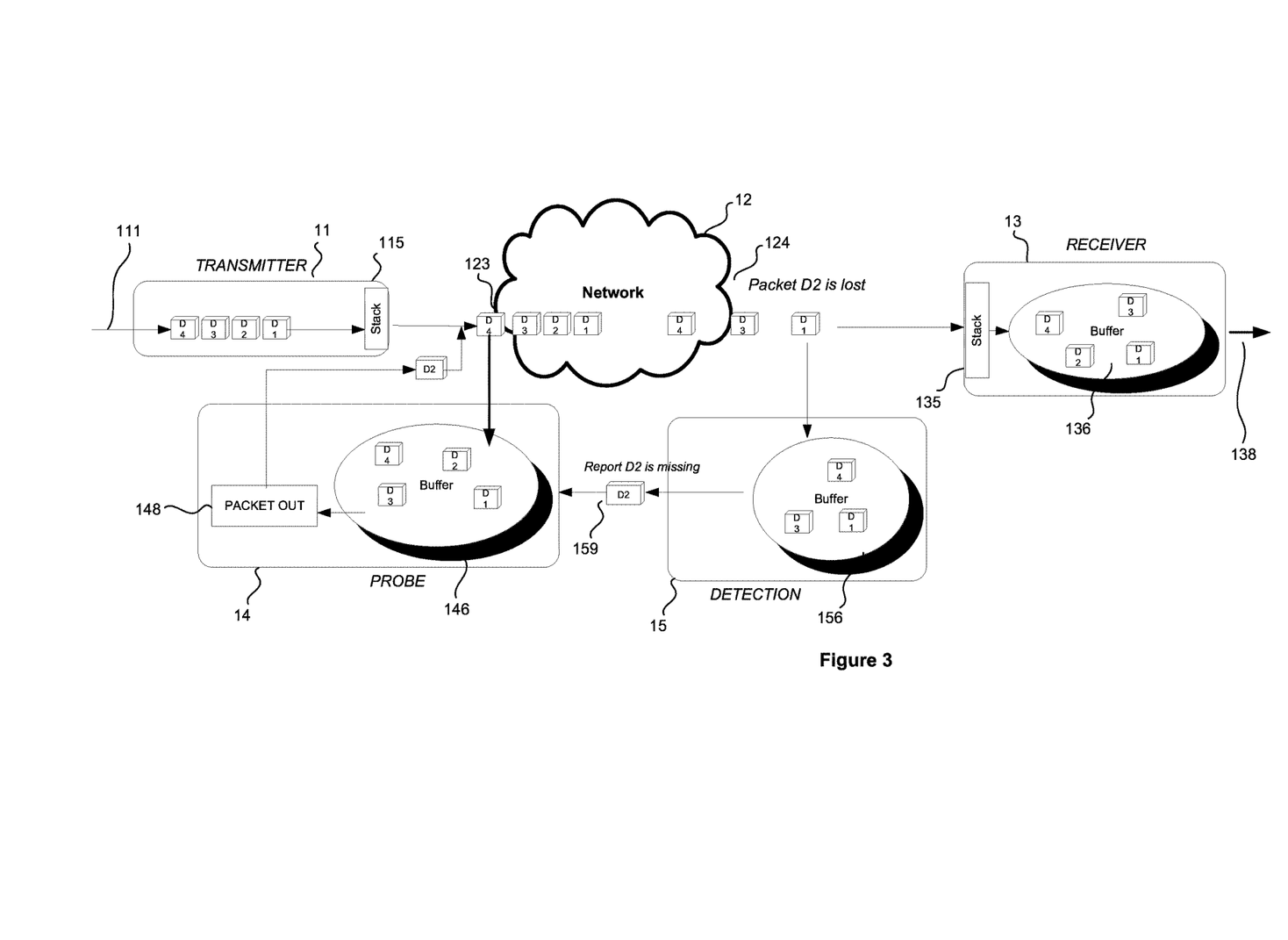
FIG. 3 illustrates a system for protecting media streaming in a non-intrusive implementation.

FIG. 3 illustrates a system for protecting media streaming in a non-intrusive implementation, wherein the stream receiver 13 is responsible for recovering lost packets, and detection device 115 is assisting by calling lost packet events to probe device 14. In the current system, detection device 15 is configured in parallel to the stream, and stream buffering is handled by a standard RTP receiver, which reinserts the retransmitted packets into the stream.

Data in 111 is transferred to a transmitter 11 and through a stack 115 to a network 12, thence to receiver 13 and detection device 15. Transmitter 11 sends serially transmitted packets 123, including data (D1, D2, D3 . . . ) packets, over a network 12 to a receiver 13.

Detection device 15 follows the same probing as the probe device. Detection device 15 probes the incoming stream for missing packets and reports the information through a RTCP (Real Time Control Protocol—the control extension of the RTP protocol) message 159. A special RTCP message 159 is sent with a list of one or many lost packets. Probe device 14 uses the RTCP message list to read out the requested packet 148 back to the original media stream.

Figure 4:
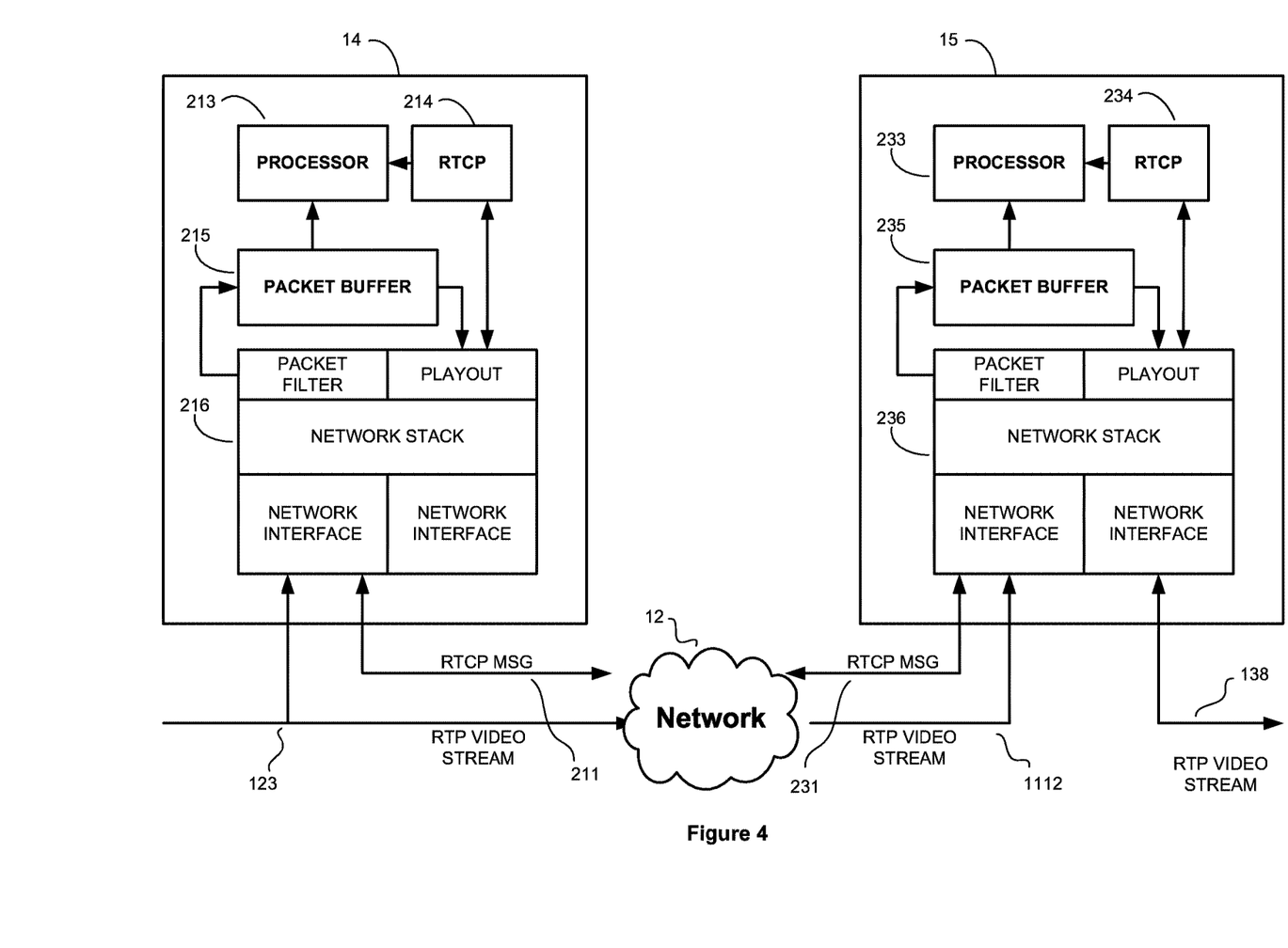
FIG. 4 illustrates, in block diagram form, a packet recovery system.

FIG. 4 illustrates, in block diagram form, a packet recovery system including the probe device 14 and its high level components, together with detection device 15 and its high level components; communicating through a network 12.

Example of an Embodiment of the Invention

A media stream encapsulated in MPEG transport is packetized in 188 byte packets, each packet having a 8 byte header. Every 1 to 7 transport packets are encapsulated into one UDP packet. The UDP packet is then prefixed with an RTP header that includes information about its position in the stream, for example: (Sequence number)+coding information+time stamp+source contribution list.

An RTCP control protocol is running in parallel to the data stream and provides control/status information about the health of the stream, clients and source devices.

Probe device 14 may communicate through the RTP video stream 123 and the RTCP message 211. Device 14 may include a packet buffer 215, processor 213, RTCP 214, and unit 216 including a packet filter, playout, network stack and a network interface means.

Detection device 15 may communicate through the RTP video stream in 1112, RTCP message 231 and RTP video stream out 138.

Detection device 15 may include a packet buffer 235, processor 233, RTCP 234, and unit 236 including a packet filter, playout, network stack and network interface means.

Figure 5:
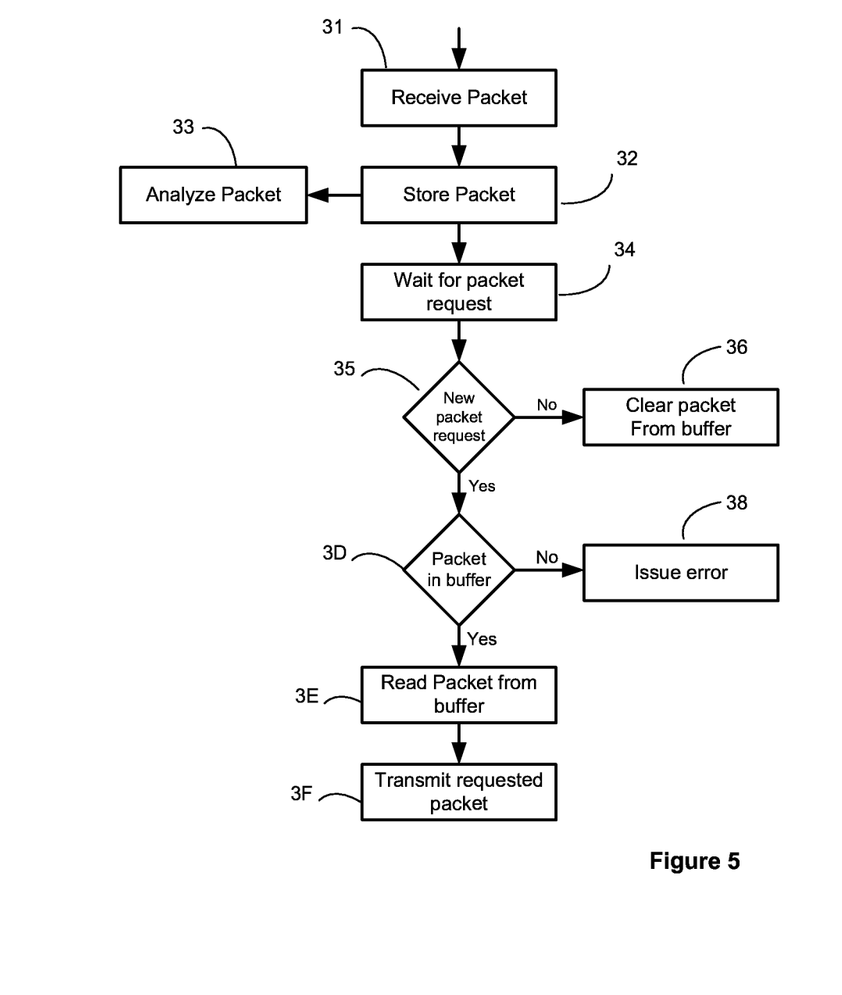
FIG. 5 illustrates a probe flow chart.

FIG. 5 illustrates a probe flow chart The Probe method may include:
1. RTP stream packets are received, step 31
2. RTP packets are stored in a dedicated stream buffer/storage, step 32
   a. Stored packets content is analyzed, step 33
3. The device waits for packet requests, step 34
3a. A new packet request is requested?, step 35
3b. If No: Old packets are cleared from the buffer, step 36
4. If Yes:
5. Check if the packet is still in the buffer 3D, step
5a. If No: Issue error 38
6. If Yes: Read the requested Packet from the buffer, step 3E
7. Send the packet to the original stream, step 3F

Figure 6:
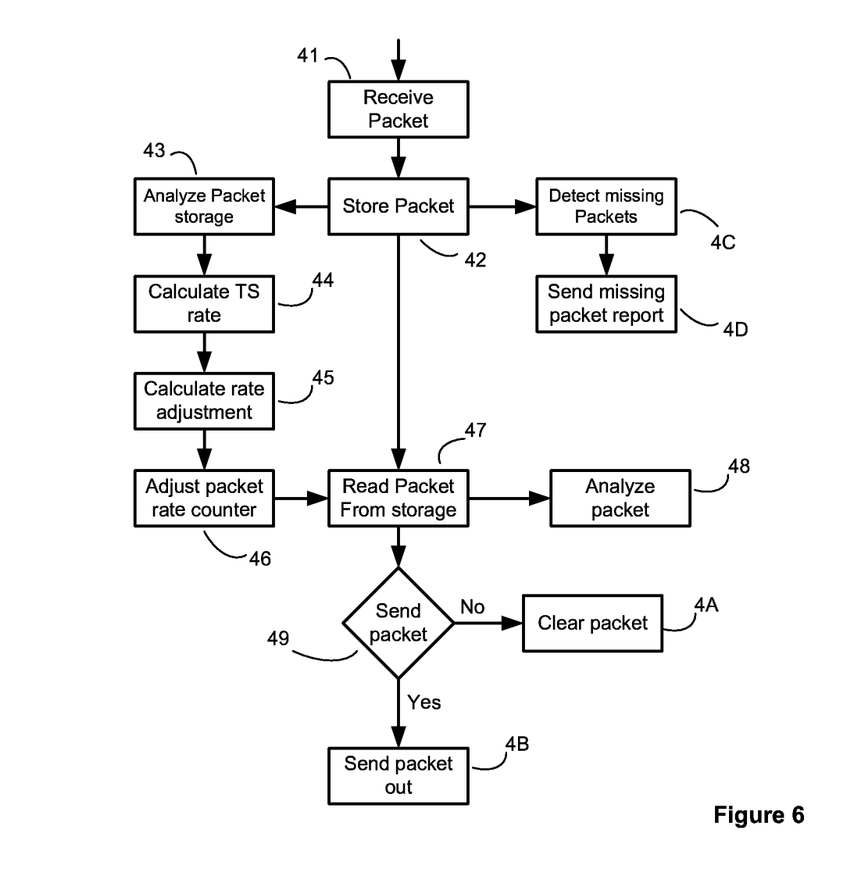
FIG. 6 illustrates a detection flow chart.

FIG. 6 illustrates a detection flow chart. The Detection method may include:
1. RTP stream packets are received, step 41
2. RTP packets are stored in a dedicated stream buffer/storage, step 42
   a. Stored packets content is analyzed, step 43
   b. Calculate TS rate, step 44
   c. Calculate the rate step adjustment, step 45
   d. Adjust rate counter, step 46
3. Packets sequence counter (stored in the RTP header) are scanned for missing packet detection, step 4C
   a. A RTCP is sent to a Probe device, step 4D
4. Packets are read out according to their rate out, step 47
   a. Packets are analyzed to extract their stream, video information and statistics, step 48

5. Is Packet intended to be sent out?, step 49
   a. If Yes the packet is read out, step 4B
   b. else the packet is cleared, step 4A

Figure 7:
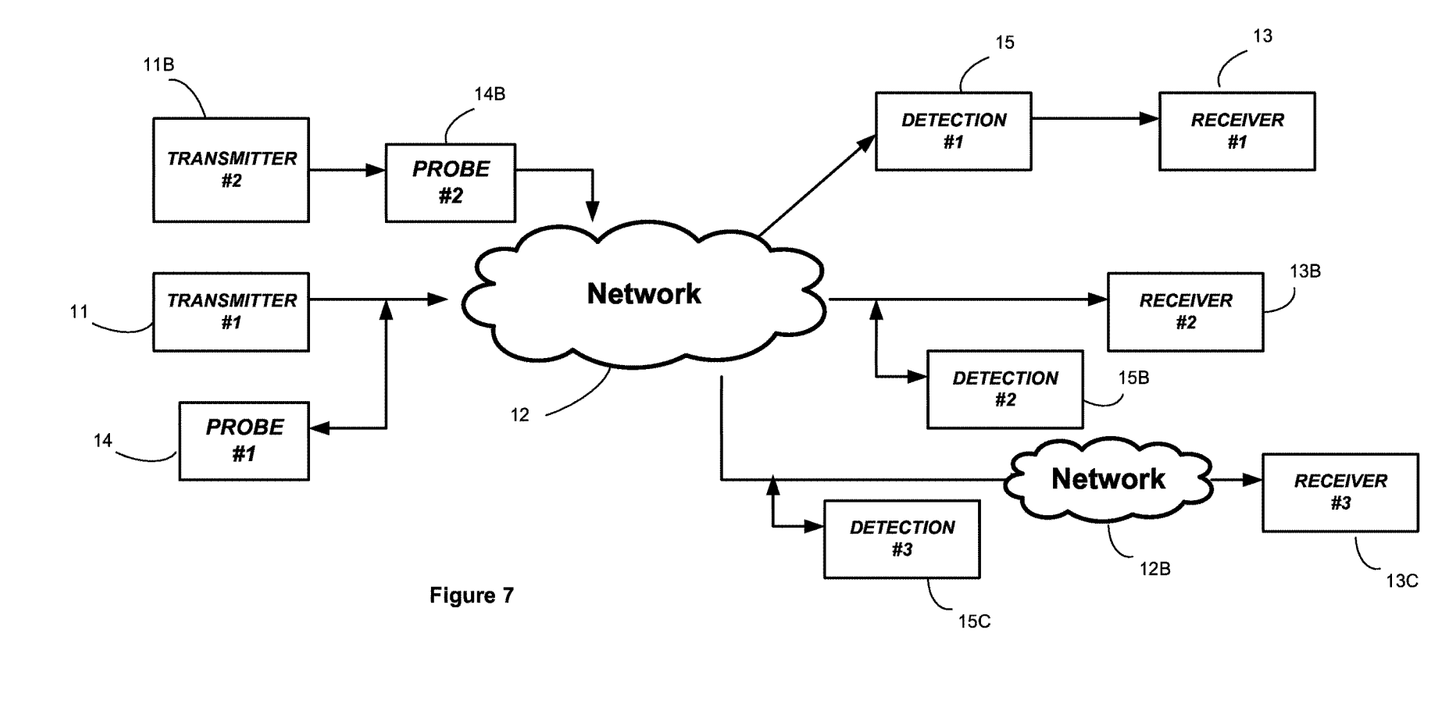
FIG. 7 illustrates a system architecture including both intrusive and non-intrusive deployment topology.

FIG. 7 illustrates a system architecture including both intrusive and non-intrusive deployment topology. The figure shows a system description and the various options for deploying probe and detection devices.

For example, probe #1 14 is connected in a non-intrusive mode (in parallel with transmitter #1 11), whereas probe #2 14B is connected in an intrusive mode (in series with transmitter #2 11B). The detection device #1 15 is connected in an intrusive mode (in series with receiver #1 13), whereas the detection devices #2 15B and #3 15C are connected in a non-intrusive mode (in parallel with receivers #2 13B and #3 13C respectively).

The intrusive devices (probe #2, detection #1) have at least one input and one output interface. Data flows from input to output with added processing in the device itself. A benefit of using an intrusive probe device (probe #2) is a simpler data flow through each element; data flow from transmitter #2 through probe #2 allows for easy connection and a clear traffic flow, so that the probe device is assured to receive all the packets from the transmitter into its packet buffer.

A benefit of using a detection device in an intrusive mode is a larger buffer, which can shield/buffer the receiver device from network artifacts such as jitter, packet reorder and packet loss. Another benefit of the intrusive mode is that it allows the detection device (see detection #1 15) to recover packets without the knowledge of the receiver (receiver #1 13) and to perform a rate adjustment.

The non-intrusive device (probe #1 14, detection #2 15B and #3 15C) has only a common input and output interface, data flow in and out of the device with added processing in the device. A benefit of using a non-intrusive device is an ability to put the device anywhere in the network in a seamless fashion, so that it does not disturb the original network traffic. The device can be simply added to the network along with respective capabilities.

Probe #1 14 is added in parallel to transmitter #1 11. It is the network operator's responsibility to duplicate/direct the traffic from transmitter #1 11 to allow probe #1 14 to capture packets in its memory buffer.

Detection #2 15B and #3 15C may be placed somewhere along network 12 to allow detection of packet loss events and to alert probe device 14 or 14B to take action.

The system and method described hereinabove may be used in conjunction with a system which consist of retransmission block and network jitter reduction. Note: This is common to both retransmission and network jitter reduction.

Embodiments of the present invention comprise a system solution to protect a media network from artifacts of packet loss and network jitter. The system consists of a probe device (probe #1,#2) connected in an intrusive or non-intrusive mode, and a detection device (detection #1), connected in an intrusive mode, see FIG. 7.

The detection device performs two major tasks: detection of missing packets and reinsertion of retransmitted packets and network jitter reduction. A unique feature of this solution is that the detection device shields the network artifices from the receiver device (receiver #1 13) to allow it to receive a media stream free of lost packets and with a minimal jitter—which are crucial to media reception solutions.

A System for Protection, Media Streaming and Network Jitter Reduction Using Dual Network Paths An embodiment of the present invention comprises a system solution to protect a media streaming network from artifacts of packet loss and network jitter; the system consists of a probe device (probe #1) connected in an intrusive or non-intrusive mode, and a detection device (detection #1) connected in an intrusive mode. The probe and detection devices are connected to two distinct networks: a public network in which data is streamed and a private/VPN network in which the probe and detection devices act to communicate and send corrective packets.

Figure 8:
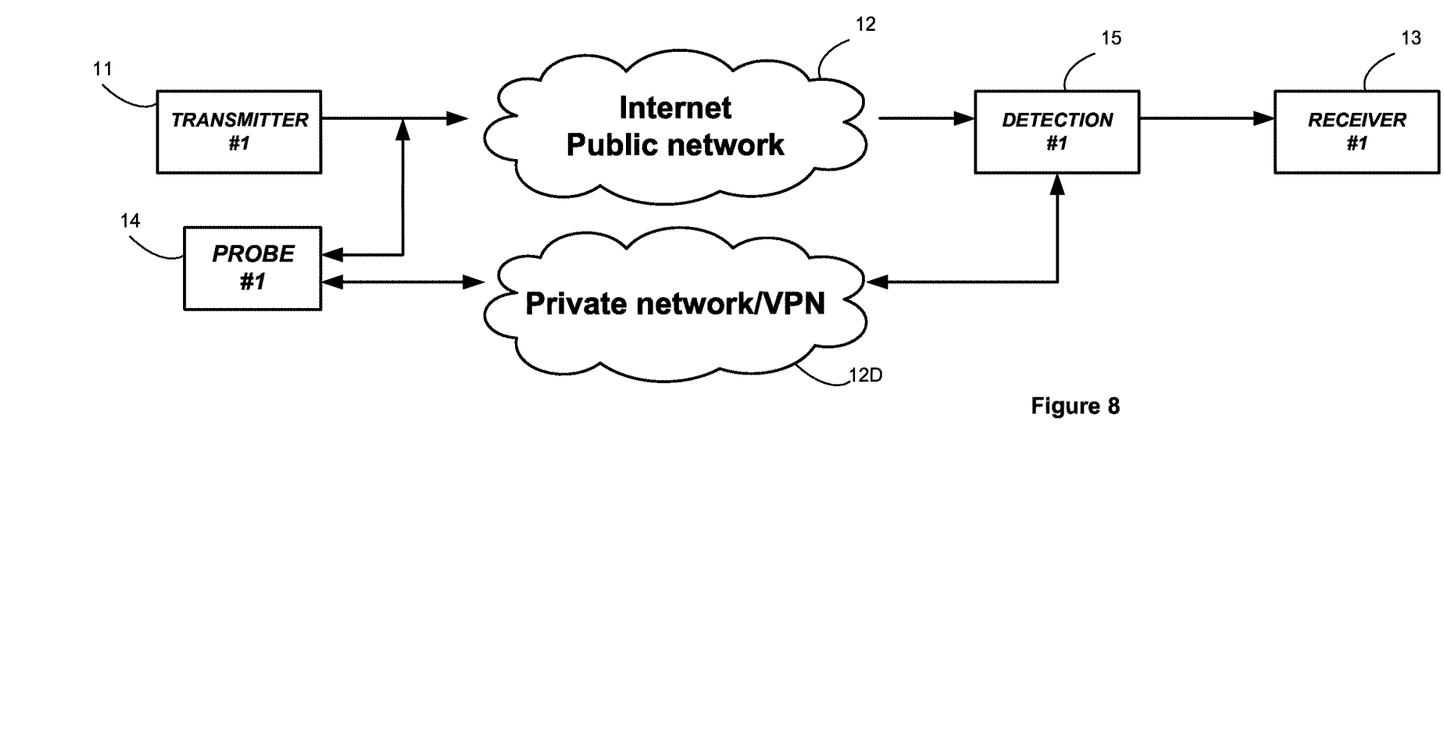
FIG. 8 illustrates a system architecture using both a public and a private network.

FIG. 8 illustrates a system architecture using both a public and a private network. The Stream is traveling through public network 12 to detection device 15, while data relating to the corrective action travels through a private/VPN network 12D (which preferably should be error-free or has a lower error rate).

A probe device (probe #1 14) connects to the stream for media packet buffering and to a VPN 12D connection for RTCP and Recovery packets. A detection device (Detection #1 15) may connect in an intrusive mode to both the data stream and a VPN connection.

The detection device buffers the received packets in its packet memory buffer and uses the VPN connection to request and receive correction packet retransmission). The detection device shields and/or buffers the network jitter from the receiver device (receiver #1 13). NOTE: This is a combination of the above two items.

Figure 9:
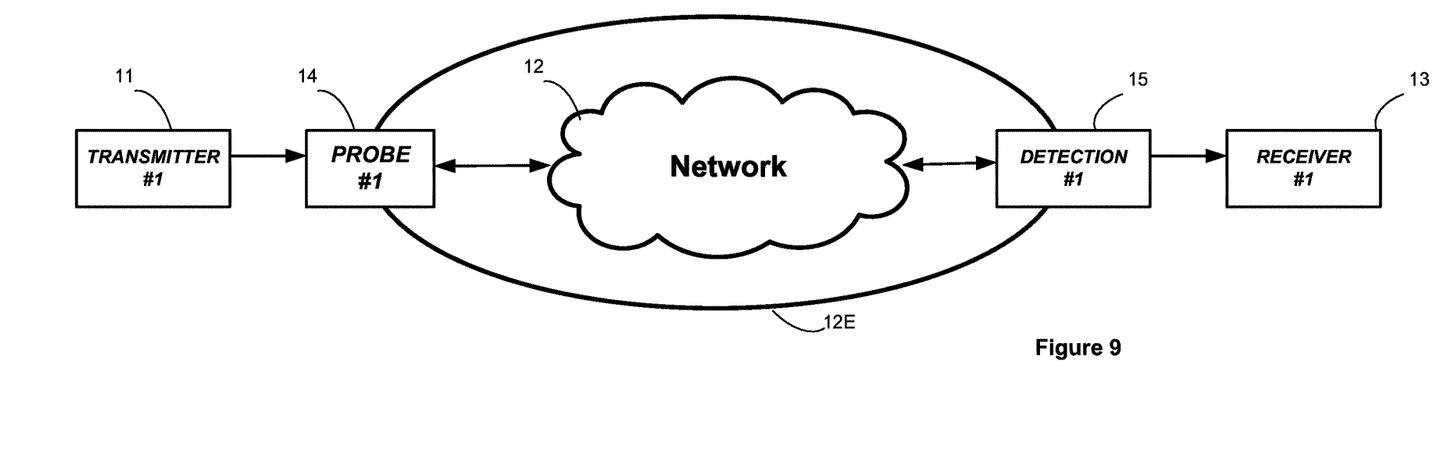
FIG. 9 illustrates a system architecture wherein a probe and a detection means communicate through the network and apply a retransmission technique.

A System for Protecting UDP Media Streaming and for Network Jitter Reduction Using an UDP to RTP Conversion and an RTP Retransmission Technique This system may be used to stream a UDP media stream from one transmitter 11 to a one or more receivers 13 (see FIG. 9). The incoming stream is buffered in the probe (probe #1 14) packet buffer; each UDP packet is converted by probe device 14 from UDP protocol to an RTP protocol by adding a RTP header and a virtual time stamp to each UDP packet.

Probe 14 and detection 15 devices may then use an additional method to recover lost packets in the stream between them. A major benefit is the ability to convert from an unrecoverable streaming protocol to a recoverable one and back to a system that does not support RTP protocol.

FIG. 9 illustrates a system architecture wherein a probe 14 and detection means 15 communicate through a network 12 and apply packet recovery technique by means of retransmission of lost packets, for a transmission from the transmitter #1 11 to the receiver #1 13.

The UDP stream entering probe 14 is first converted to RTP, while detection device 15 converts the UDP stream back from RTP to UDP. Detection device 15 buffers the received packets and applies a correction to recover lost packets. Detection device 15 strips the RTP header from each packet to convert it back to a UDP and transmit it to the receiver (receiver #1 13). Packets are sent using the novel rate jitter reduction feature to reduce network jitter.

A System for Protecting Available Bit Rate Streaming Using Media Packet Loss Recovery An embodiment of the present invention comprises a system solution to protect an Available Bit Rate (ABR). The system includes means for encoding and streaming solution, changing its encoding bit rate according to bandwidth changes in the network and/or an increase of the packet loss rate.

The ABR encoding systems senses an increase of network packet loss rate and reduces its encoding bit rate in direct relation to the error rate. The ABR streaming solution does not recover any loss packet immediately, but rather acts to reduce future packet loss by reducing the encoding bit rate. The solution combines the technique of packet loss recovery to recover any lost packets that occur prior to the change in the encoding bit rate. The solution's ability to recover lost packets provides error free streaming, compared to current ABR streaming solution.

An embodiment of the present invention comprises a system solution to protect an ABR encoding media streaming from artifacts of packet loss and network jitter; The system may include a probe device (probe #1, #2) connected in an intrusive or non-intrusive mode, and a detection device (Detection #1), connected in a intrusive mode, and detection devices (detection #2, #3) connected in a non intrusive mode, see for example FIG. 7. The probe and detection devices act to recover any network related packet loss.

The detection device performs three major tasks: detection of missing packets (detection #1, #2, #3), reinsertion of retransmitted packets (detection #1, #2, #3) and network jitter reduction (detection #1).

A unique feature of this solution is that the detection device (detection #1) shields the network artifices from the receiver device (receiver #1 13) to allow it to receive a media stream free of lost packets and with a minimal jitter—which may be a result of bit rate modification by the ABR encoding solution and/or network jitter artifacts.

It will be recognized that the foregoing is but one example of an apparatus and method within the scope of the present invention and that various modifications will occur to those skilled in the art upon reading the disclosure set forth hereinbefore.

What is claimed is:

1. In a network for reliable transfer of media stream in MPEG transport packets from a transmitter to a receiver using a Real-time Transport Protocol (RTP) over a VPN and a public network, a system for packet recovery comprising:
a detection block (detector) for packet loss detection and a probe device (probe) for lost packet retransmission;
the detector configured to:
send a packet retransmit request to the probe using an RTP Control Protocol (RTCP) message upon detection of a packet loss (a lost packet); and
shield/buffer the receiver from network artifacts chosen from at least one chosen from a list consisting of: jitter; packet reorder; and packet loss; and
recover lost packets without the knowledge of the receiver; and
perform a rate adjustment;
the probe configured to:
store received packets; and
retransmit the lost packet responsive to the retransmit request.

2. The system according to claim 1, wherein the packets comprise a media stream or a plurality of media streams.

3. The system according to claim 1, wherein the packets comprise a video over IP stream or a plurality of video over IP streams.

4. The system according to claim 1 or 2, wherein the probe is configured to store each packet for a predetermined time period.

5. The system according to claim 4, wherein the probe has a cyclic buffer configured to store each packet.

6. The system according to claim 5, wherein the network includes a plurality of probes and/or detectors.

7. The system according to claim 6, wherein the network includes additional RTP receivers and wherein at least one of the additional RTP receivers is configured to:

treat the packet retransmitted from the probe as a re-ordered packet; and to place the retransmitted packet in its correct location with the transferred packets.

8. The system according to claim 7, wherein the RTP receiver is further configured, in case of reception of more than one request for the same loss event resulting from a plurality of retransmitted packets sent by the probe, to enable the receiver to ignore duplicate packets and to respond as in an event of a packet duplication.

9. The system according to claim 1 or 2, wherein the probe is configured to receive the retransmit request using an RTCP message.

10. The system according to claim 1 or 7, wherein the detector is further configured to send a message indicating a plurality of packets loss event.

11. The system according to claim 10, wherein the system uses a multi-layered solution to send one or more requests of missing events, to provide a higher protection assurance.

* * * * *